(12) United States Patent
Willberg-Keyriläinen et al.

(10) Patent No.: US 12,497,494 B2
(45) Date of Patent: Dec. 16, 2025

(54) CELLULOSE-BASED EXTRUSION FOAMS

(71) Applicant: Teknologian tutkimuskeskus VTT Oy, Espoo (FI)

(72) Inventors: Pia Willberg-Keyriläinen, Espoo (FI); Jarmo Ropponen, Espoo (FI); Tero Malm, Espoo (FI); Teijo Rokkonen, Espoo (FI); Hannu Minkkinen, Espoo (FI); Ali Harlin, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 548 days.

(21) Appl. No.: 17/923,930

(22) PCT Filed: May 10, 2021

(86) PCT No.: PCT/FI2021/050342
§ 371 (c)(1),
(2) Date: Nov. 8, 2022

(87) PCT Pub. No.: WO2021/224553
PCT Pub. Date: Nov. 11, 2021

(65) Prior Publication Data
US 2023/0257542 A1    Aug. 17, 2023

(30) Foreign Application Priority Data
May 8, 2020  (FI) .................................. 20205467

(51) Int. Cl.
C08J 9/00    (2006.01)
B29C 44/20   (2006.01)
(Continued)

(52) U.S. Cl.
CPC ............. *C08J 9/0066* (2013.01); *C08J 9/141* (2013.01); *B29C 44/20* (2013.01);
(Continued)

(58) Field of Classification Search
CPC ..... B29C 49/04; B29C 48/03; B29C 48/0017; B29C 48/0013; B29C 48/001; C08J 9/141; C08J 9/0066
See application file for complete search history.

(56) References Cited

U.S. PATENT DOCUMENTS 3,406,230 A * 10/1968 Baxter ................ B29C 44/468
                                                  521/146
5,464,878 A    11/1995 Nemphos et al.
(Continued)

FOREIGN PATENT DOCUMENTS

DE    102013005568 A1    10/2013
JP    H05320405 A        12/1993
(Continued)

OTHER PUBLICATIONS

Malm et al: Aliphatic Acid Esters of Cellulose properties. Industrial and Engineering Chemistry, Mar. 1951. vol. 43, No. 3, pp. 688-691. https://pubs.acs.org/doi/abs/10.1021/ie50495a034.
(Continued)

*Primary Examiner* — Stella K Yi
(74) *Attorney, Agent, or Firm* — Laine IP Oy (57) ABSTRACT

According to an example aspect of the present invention, there is provided an extrusion foaming method for producing low-density extrusion foam from a thermoplastic cellulose-based starting material.

17 Claims, 4 Drawing Sheets

(51) Int. Cl.
   *B29C 44/34*     (2006.01)
   *B29K 1/00*      (2006.01)
   *C08J 9/14*      (2006.01)
(52) U.S. Cl.
   CPC ...... *B29C 44/3442* (2013.01); *B29C 44/3446* (2013.01); *B29K 2001/08* (2013.01); *C08J 2201/03* (2013.01); *C08J 2203/06* (2013.01); *C08J 2203/14* (2013.01); *C08J 2301/10* (2013.01); *C08J 2301/26* (2013.01)

(56) References Cited

U.S. PATENT DOCUMENTS

| | | |
|---|---|---|
| 5,656,682 A | 8/1997 | Rimsa et al. |
| 6,221,924 B1 | 4/2001 | Mori et al. |
| 2019/0351592 A1 | 11/2019 | Falken |

FOREIGN PATENT DOCUMENTS

| | | |
|---|---|---|
| WO | WO2016193542 A1 | 12/2016 |
| WO | WO201816386 A1 | 8/2018 |
| WO | WO2018146386 * | 8/2018 |

OTHER PUBLICATIONS

Willberg-Keyriläinen et al: The effect of cellulose molar mass on the properties of palmitate esters. Carbohydrate Polymers, 2016. vol. 151, pp. 988-995.http://dx.doi.org/10.1016/j.carbpol.2016.06.048.

* cited by examiner

FIG. 7

CELLULOSE-BASED EXTRUSION FOAMS

FIELD

The present invention relates to novel cellulose-based extrusion foams produced by extrusion foaming.

BACKGROUND

Recently, sustainable and bio-based material solutions have gained significant interest due to their reduced environmental impact. Foaming of polymeric materials enables weight reduction, which is a very important aspect from the economic point of view. The most conventional applications for foams are damping materials, thermal and acoustic insulation, packaging materials and absorbents. Currently, typical thermoplastic foams are based on petrochemicals like polystyrene (PS) or polyolefins (PP, polypropylene or PE, polyethylene).

At the moment, most of commercial foam materials are made from fossil oil. Burning products made from fossil oil increases the $CO_2$ level of the atmosphere and accelerates the effect of the climate change. New bio-based material used for the production of extrusion foams has to have suitable properties from processing perspective. Also end product properties have to be in desired level. Typically cellulose based foams are rigid and have no resilient recovery from compression.

WO 2016/193542 A1 relates to affordable cellulose raw material with a beneficial method of preparing molar mass controlled transportable feed stock for added value applications in biomaterials manufacturing, including thermoplastic, dispersion able or dissolving derivatives. Although the starting material is similar than in the present invention, it does not disclose extrusion foaming methods for preparing extrusion foams from such.

There is thus a need for means to modify cellulose fibers in order to have different thermoplastic properties for providing greater use of cellulose-based materials in extrusion foam production.

SUMMARY OF THE INVENTION

The invention is defined by the features of the independent claims. Some specific embodiments are defined in the dependent claims.

According to an aspect of the present invention, there is provided an extrusion foaming method for preparing cellulose-based extrusion foams.

According to another aspect of the present invention, there is provided an extrusion foaming method for preparing cellulose-based extrusion foams from a fully bio-based thermoplastic molar mass controlled cellulose esters or ethers, and cellulose-based extrusion foams thereof having low-density for various end-uses, such as for purposes of the packaging industry.

These and other aspects, together with the advantages thereof over known solutions are achieved by the present invention, as hereinafter described and claimed.

The extrusion foaming method according to the present invention is mainly characterized by what is stated in the characterizing part of claim 1.

The cellulose-based extrusion foam according to the present invention is characterized in claim 11.

Considerable advantages are obtained by means of the present invention. The presented method shows that thermoplastic cellulose is suitable for extrusion foaming and provides means to produce low-density foam strands, wherein the end product properties (e.g. density, pore size) can be varied adjusting for example foaming agents (grade, amount). The foams prepared by method of the present invention have resilience and recovery from compression. In addition, the required temperatures in the foaming process are essentially lower than in typical cellulose-based foaming methods.

Next, the present technology will be described more closely with reference to certain embodiments.

EMBODIMENTS

The present technology provides a method for preparing low-density foam strands from thermoplastic molar mass controlled cellulose by extrusion foaming. This technology enables use of cellulose foams in applications where cyclic loading or compressibility and recovery thereafter are required.

In the present invention suitable molar mass controlled cellulose is foamed in an extruder with a nucleating agent and a foaming agent in pre-determined reaction parameters.

According to one embodiment of the present invention, an extrusion foaming method for producing extrusion foams from a thermoplastic cellulose-based starting material comprises:
- preparing a thermoplastic molar mass controlled cellulose ester or ether having chain length between C6 and C18, preferably from a softwood dissolving grade pulp,
- injecting the molar mass controlled cellulose ester or ether and a nucleating agent into an extruder,
- injecting a foaming agent into the extruder,
- applying a temperature of 80 to 150° C. to the extruder during the foam processing,
- collecting the prepared foam.

It is preferred that the temperature is kept constant during the foam processing. Most promising results are achieved, but not limiting to, at temperatures from 105 to 130° C., preferably close to 130° C. This is essentially lower than in typical cellulose foam extrusions, which use temperatures around 180° C. or even higher.

According to one embodiment of the present invention, the molar mass controlled cellulose ester or ether is cellulose palmitate having a chain length of C16 and a total degree of substitution from 0.7 to 3, preferably 1.0. Thermoplastic cellulose palmitate is fully bio-based and provides suitable starting point for the greater use of cellulose-based starting materials in extrusion foam production.

Another variable in the present method is the selection of a suitable foaming agent, which is preferably isobutane, carbon dioxide, nitrogen and pentane. The inventors have achieved most promising results, but not limiting to, with isobutane.

According to one embodiment of the present invention, suitable foaming agent dosage is 0.2 to 10 wt-%, preferably 0.5 to 5 wt-%.

According to one embodiment of the present invention, the extruder comprises a screw geometry suitable for material melting and foaming agent homogenization, foaming agent injection device, means for melt cooling such as a static mixer or tandem extruder and a die to produce desired foam shape such as a sheet or annular die, and optionally a melt pump. The extruder screw can for example be so called foaming screw with three phase compression and an increase in inner diameter at the foaming agent injection location. Existing extruders can thus be used for the purposes of the present invention, which makes the process interesting also in the economical point of view.

According to one suitable process setup, the extruder barrel was heated with three heating bands (zones) and the foaming agent was injected between zones 2 and 3. The extruder is also equipped with a changeable round die. The die geometrics used were 1/15 and 2/20 (diameter/length in millimeters). Additionally, the extruder hopper was shielded with nitrogen flow (~5 l/min) to prevent the material from absorbing moisture.

According to one embodiment of the present invention, the nucleating agent is selected from talc, calcium carbonate, calcium hydroxide, calcium stearate, zinc stearate, aluminium stearate, azodicarboamide, sodium bicarbonate, mixture of citric acid and sodium bicarbonate, sodium and potassium benzoates and dibenzylidene sorbitol (DBS).

According to one embodiment of the present invention, a die pressure of 50 to 300 bars, preferably 60 to 200 bars, and more preferably 60 to 130 bars is used in the method.

Thermoplastic cellulose-based extrusion foams, which have low-density and are produced by the presented method also belong to the scope of the present invention. According to one embodiment, the thermoplastic cellulose-based extrusion foam has a density as low as 0.1 to 0.5 g/cm$^3$. Low density is an important technical feature, because it provides improved insulation in terms of temperature, impact and sound. In addition, low density thermoplastic cellulose-based extrusion foams are lighter, which reduces material and transportation costs.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

The present innovation of cellulose-based extrusion foams finds potential use in applications where cyclic loading or compressibility and recovery thereafter are required. It may be used in replacing the existing foamed petrochemical-based plastic materials in similar applications, such as in packaging industry.

EXAMPLES

Materials

Commercial softwood dissolving grade pulp purchased from Domsjö Fabriker AB (Sweden) was used as a starting material. All other reagents were analytical grade and purchased from Sigma-Aldrich (Finland).

Three different physical foaming agents (FA) were used to prepare the cellulose palmitate foams. Carbon dioxide ($CO_2$) and nitrogen were purchased from AGA Oy AB and isobutane R600a (IB) was purchased from Linde Group. Foaming agent content was varied during foaming to find optimal dosing. Finntalc M05SL (median particle size 2.2 μm) was used as a nucleating agent. Nucleating agent amount was kept constant at 1.2 wt %. Nucleating agent was dry blended by hand in a bag with the cellulose palmitate before processing.

Preparation of Cellulose Palmitate

The cellulose palmitate was prepared using the homogeneous method presented by Willberg-Keyriläinen et al. (2016). In this method, dry cellulose was first dissolved in a 5% LiCl/DMAc solution. Then palmitoyl chloride, 3 equivalents to cellulose anhydroglucose unit (AGU) was added to the cellulose mixture using pyridine (3.6 equivalents/AGU) as catalyst. The reaction temperature was 80° C. and reaction time 16 hours. The product was precipitated with ethanol and washed with ethanol and acetone. The degree of substitution (DS) of prepared cellulose palmitate was 1.0 (according to the solid state NMR).

Extrusion Foaming

Foams were prepared with Brabender Plastograph EC plus 19 mm single screw extruder (Brabender GmbH & Co KG, Germany). The extruder was also equipped with a melt pump (MP) and a melt cooler (MC). The melt cooler was a static mixer with oil tempering. The extruder screw was so called foaming screw with three phase compression and an increase in inner diameter at the foaming agent injection location. The extruder barrel was heated with thee heating bands (zones) and the foaming agent was injected between zones 2 and 3. The extruder was also equipped with a changeable round die. The die geometries used were 1/15 and 2/20 (diameter/length in millimeters). Additionally, the extruder hopper was shielded with nitrogen flow (~5 l/min) to prevent the material from absorbing moisture.

Foaming agents were injected and pressurized with Teledyne ISCO dual syringe pump system (Teledyne ISCO Inc., USA). Since carbon dioxide and isobutane can be liquefied, they were also dosed with the Teledyne pump. The injection pressure for carbon dioxide and isobutane was approximately 120 bar and 85 bar, respectively. In order to aid liquefaction the pump was cooled to 2° C. However, since nitrogen cannot be easily liquefied and has to be injected as gas, it was dosed with Bronkhorst EL-FLOW mass flow controller (Bronkhorst High-Tech B.V., The Netherlands).

Still, the Teledyne pump was used to pressurize the nitrogen gas to 200 bar. Foaming agent dosage was calculated as mass percentage based on the material throughput determined by measuring a 1 min sample by hand.

Figure 1:
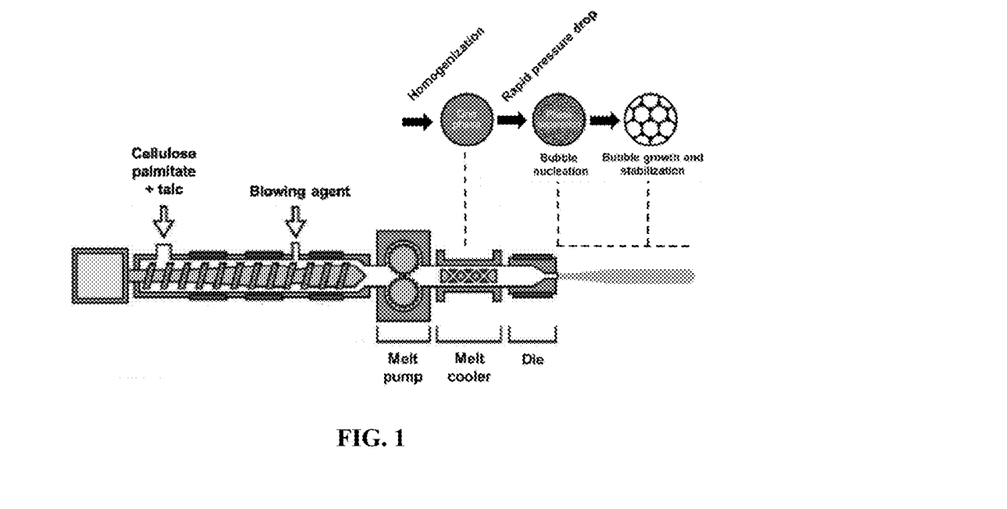
FIGS. 1 and 2 are process setups according to suitable embodiments of the present invention.
Figure 2:
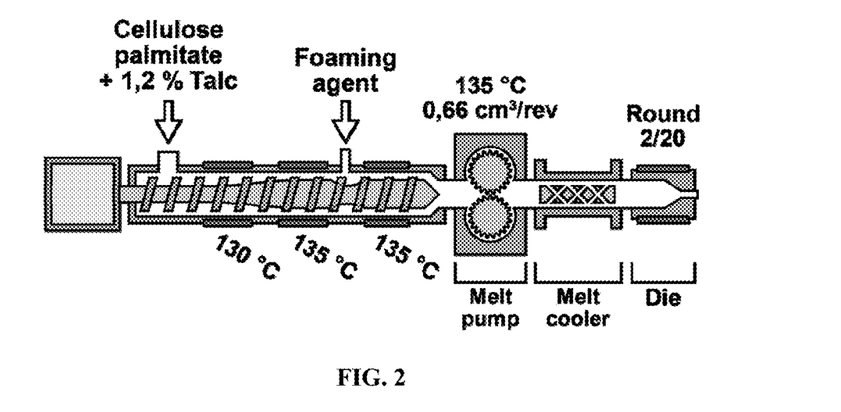

During the foam processing, extruder barrel temperatures and melt pump temperatures were kept constant. The temperature profile in the three extruder zones was 130° C.-135° C.-135° C. and the melt pump temperature was 135° C. Therefore, to prepare the sample only the melt cooler and die temperatures were changed. Other processing related variables were foaming agent concentration, melt pump RPM (material throughput) and die geometry. When a foam sample was taken the die pressure was recorded with Brabender's WinEXT software. Extrusion foaming setup is presented in FIGS. 1 and 2.

First, all three foaming agents were tested individually with the cellulose palmitate to asses-which foaming agent worked best with the material. Based on analytics and general foam appearance and feel, the one foaming agent was selected for temperature scouting experiment.

Density Measurement

Due to the irregular shapes of the prepared foams, the densities were determined with liquid submersion technique. Water purified with reverse osmosis was used as the liquid media. Four parallel measurements were made from each foam sample. Weighting was performed with Mettler Toledo XS205 DualRange scale (Mettler Toledo, USA).

Scanning Electron Microscopy

Scanning electron microscope (SEM) images were taken in order to determine the cell size, wall thickness and general cell structure. Images were taken with JEOL JSM-6360LV. A small section of the foam extrudate was frozen in liquid nitrogen and fractured. The fracture surfaces were then gold coated with Bal-Tec Balzers SCD050 sputter coater. Acceleration voltage of 7 kV was used and the images were constructed from secondary electrons.

Tomography

Cell size distribution was analyzed using X-ray microcomputed tomography (XμCT). Samples were imaged using Rx Solutions desktom 130 scanner (RX solutions, Chavanod, France). 40 kV acceleration voltage and 3.7 μm voxel size was used. Scanning time was around 60 minutes per sample. To measure pore sizes local thickness transform was used. The local thickness transform fits spheres into the structure such that the spheres fill the void space optimally. The method defines for each voxel the maximal sphere it belongs to. This makes it possible to calculate the volume normalized probability distribution for the pore sizes.

Effect of Foaming Agent

Isobutane (TB), carbon dioxide ($CO_2$) and nitrogen ($N_2$) are typical physical foaming agents, which can be used to produce low-density foams. The effect of these three foaming agents on cellulose palmitate foam properties were studied using different concentrations and the detailed foaming parameters for prepared cellulose palmitates are tabulated in Table 1. All prepared foams produced foam strands and the side profiles and SEM images of formed foams are presented in FIG. 3 and FIG. 4. The densities of cellulose palmitate foams are shown in Table 2. The density results indicate that the density of the cellulose palmitate foams decreased significantly as the foaming agent content increased.

Typically, the melt cooler temperature might be the same or little above the die temperature. However, these samples were prepared with melt cooler at a lower temperature than the die. The goal was to reduce the material temperature significantly while heating only the surface of the material at the die to prevent clogging of the die. The aim was also to keep the temperatures same with varying foaming agent concentration. Sample $CO_2$-0.5 was produced at a higher die temperature (120° C.) than the other $CO_2$ samples (115° C.) since temperatures below 120° C. caused the material to freeze at the die. Carbon dioxide at 0.5% did not provide plasticization enough to the material in order to reach the lower processing temperature. Maximum foaming agent concentrations for isobutane, carbon dioxide and nitrogen were 5%, 3%, and 1% respectively. Maximum foaming agent amount was determined in-situ by evaluating the foaming behavior of the extruded material. With too high foaming agent amount, the foam would be rupturing prematurely producing a slight popping sound and collapse. The amount of maximum foaming agent is related to the foaming agent solubility to the cellulose palmitate as well as relationship between the material melt strength and specific volume of the foaming agent.

Figure 3:
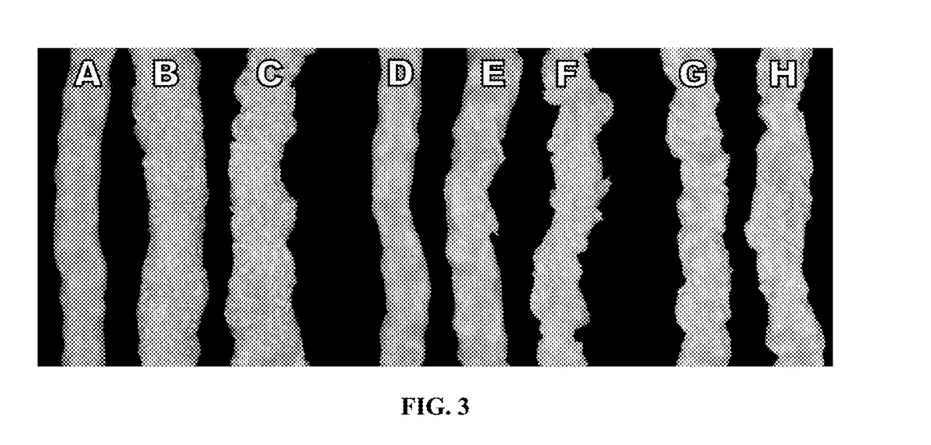
FIG. 3 is a photo showing foam side profiles for foams prepared by different foaming agent samples: a) IB-1, b) IB-3, c) IB-5, d) $CO_2$-0.5, e) $CO_2$-1, f) $CO_2$-3, g) $N_2$-0.5, h) $N_2$-1.
Figure 4:
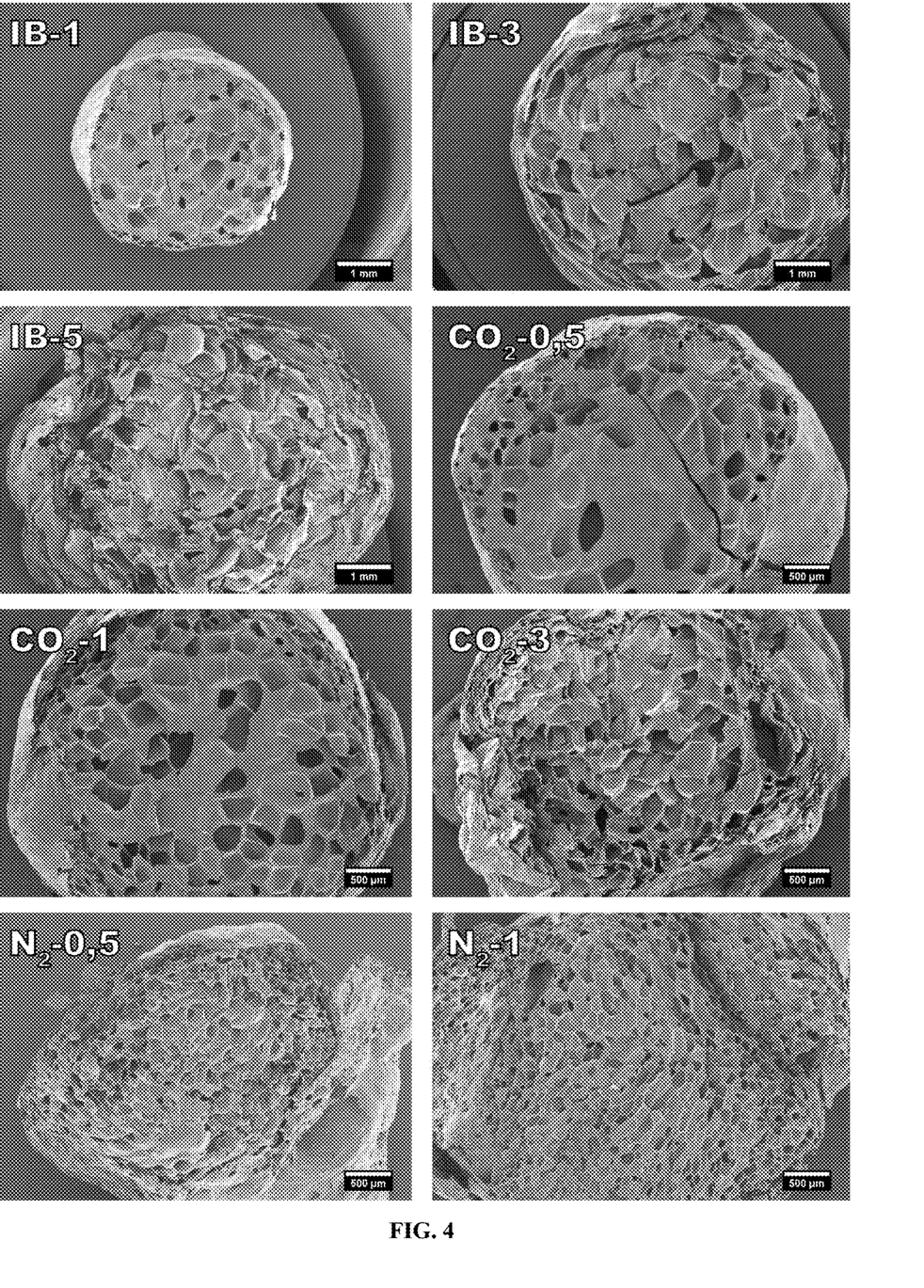
FIG. 4 is a SEM-image showing foams prepared by different foaming agent samples.

All three physical foaming agents were able to foam the cellulose palmitate material successfully. Visual appearance of the produced foam strands is presented in 3. While foams produced with low foaming agent concentrations share some visual characteristics, foams produced with higher concentration show differences between foaming agents better. Foams produced with isobutane have slightly higher expansion than nitrogen and carbon dioxide which are more close to each other.

Surface quality or foam uniformity was not particularly good with any of the foamed samples which is probably related to the material properties itself rather than strictly foaming agent. However, differences in the surface quality between foaming agents can be detected. Carbon dioxide produced the most non-uniform surface to the foams. While isobutane also produced a foam with rough surface quality, the surface texture had more regularity to it than carbon dioxide foam. Foams produced with nitrogen had smoothest surface (looking past material irregularities) and highest shine.

TABLE 1

| | | | Foaming parameters | | | | |
|---|---|---|---|---|---|---|---|
| Sample ID | Foaming agent | FA [wt-%] | Temperature [° C.] MC | Die | Die geom. | Die pressure [bar] | Throughput [g min$^{-1}$] |
| IB-1 | Isobutane | 1 | 120 | 125 | 2/20 | 125 | 14 |
| IB-3 | Isobutane | 3 | 120 | 125 | 2/20 | 101 | 14 |
| IB-5 | Isobutane | 5 | 120 | 125 | 2/20 | 67 | 14 |
| $CO_2$-0.5 | Carbon dioxide | 0.5 | 110 | 120 | 2/20 | 150 | 14 |
| $CO_2$-1 | Carbon dioxide | 1 | 110 | 115 | 2/20 | 163 | 14 |

TABLE 1-continued

Foaming parameters

| Sample ID | Foaming agent | FA [wt-%] | Temperature [° C.] MC | Temperature [° C.] Die | Die geom. | Die pressure [bar] | Throughput [g min⁻¹] |
|---|---|---|---|---|---|---|---|
| CO₂-3 | Carbon dioxide | 3 | 110 | 115 | 2/20 | 101 | 14 |
| N₂-0,5 | Nitrogen | 0.5 | 110 | 120 | 2/20 | 151 | 14 |
| N₂-1 | Nitrogen | 1 | 110 | 120 | 2/20 | 145 | 14 |

TABLE 2

Foam densities

| Sample ID | Density [g cm⁻³] |
|---|---|
| IB-1 | 0.474 ± 0.071 |
| IB-3 | 0.204 ± 0.021 |
| IB-5 | 0.171 ± 0.003 |
| CO₂-0.5 | 0.448 ± 0.022 |
| CO₂-1 | 0.243 ± 0.013 |
| CO₂-3 | 0.190 ± 0.008 |
| N₂-0.5 | 0.183 ± 0.002 |
| N₂-1 | 0.191 ± 0.003 |

Effect of Foaming Temperature

To achieve low density foams, the effect of foaming agent on viscosity reduction is compensated by lowering the melt temperature. In this research all three blowing agents were first tested individually with the cellulose palmitate to assess which foaming agent worked best with the material. Based on the analytics and general foam appearance and feel, the IB (3%) as foaming agent was selected for temperature scouting experiment. The foaming experiments in the second stage were performed by lowering gradually the die temperatures from 130° C. to 105° C. Side profiles and SEM images of formed cellulose palmitate foams extruded with different die temperatures and 3% IB as foaming agent are presented in FIG. 5 and FIG. 6.

Foaming parameters used in the isobutane temperature survey are presented in Table 3. Isobutane amount was fixed to 3%. Since the foam prepared with isobutane had the largest average cell size, throughput was also doubled in hopes of faster pressure drop rate, increased nucleation, and smaller average cell size. For simplicity, melt cooler and die temperature were always set to same temperature. Foaming temperature was between 105° C. and 130° C. with 5° C. increments. Lower limit for foaming temperature was determined to be when die pressure reached 200 bar.

TABLE 3

Processing parameters used during production of temperature survey samples

| Sample ID | Blowing agent Type | wt % | Temperature [° C.] Melt cooler | Temperature [° C.] Die | Die geom. | Die pressure [bar] | Throughput [g min⁻¹] |
|---|---|---|---|---|---|---|---|
| IB-3_130° C. | Isobutane | 3 | 130 | 130 | 2/20 | 81 | 28 |
| IB-3_125° C. | Isobutane | 3 | 125 | 125 | 2/20 | 102 | 28 |
| IB-3_120° C. | Isobutane | 3 | 120 | 120 | 2/20 | 130 | 28 |
| IB-3_115° C. | Isobutane | 3 | 115 | 115 | 2/20 | 143 | 28 |
| IB-3_110° C. | Isobutane | 3 | 110 | 110 | 2/20 | 165 | 28 |
| IB-3_105° C. | Isobutane | 3 | 105 | 105 | 2/20 | 200 | 28 |

Figure 5:
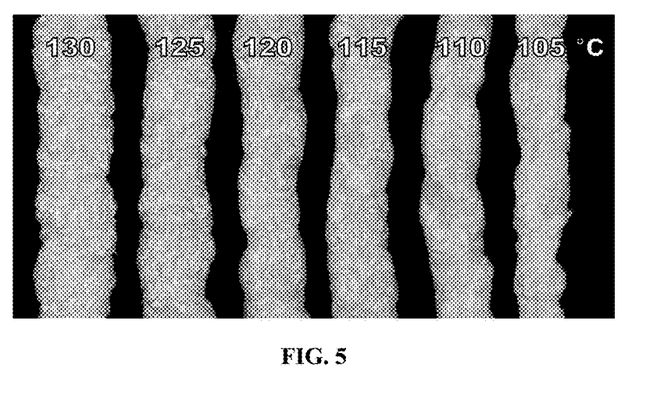
FIG. 5 is a photo showing foam side profiles for foams prepared at different temperatures.

Foam side profiles presented on FIG. 5 show that the surface is very rough at temperatures of 130° C. and 125° C. When temperature is decreased, the foam surface becomes smoother. Reduction in foaming temperature also reduces the strand diameter very slightly. At high temperature, the diffusion of isobutane is fast and the stiffness of material is too low to accommodate for the gas loss. This results in high expansion but also high amount of shrinking. At low temperature, blowing agent does not have enough expansion power to foam the material fully.

Figure 6:
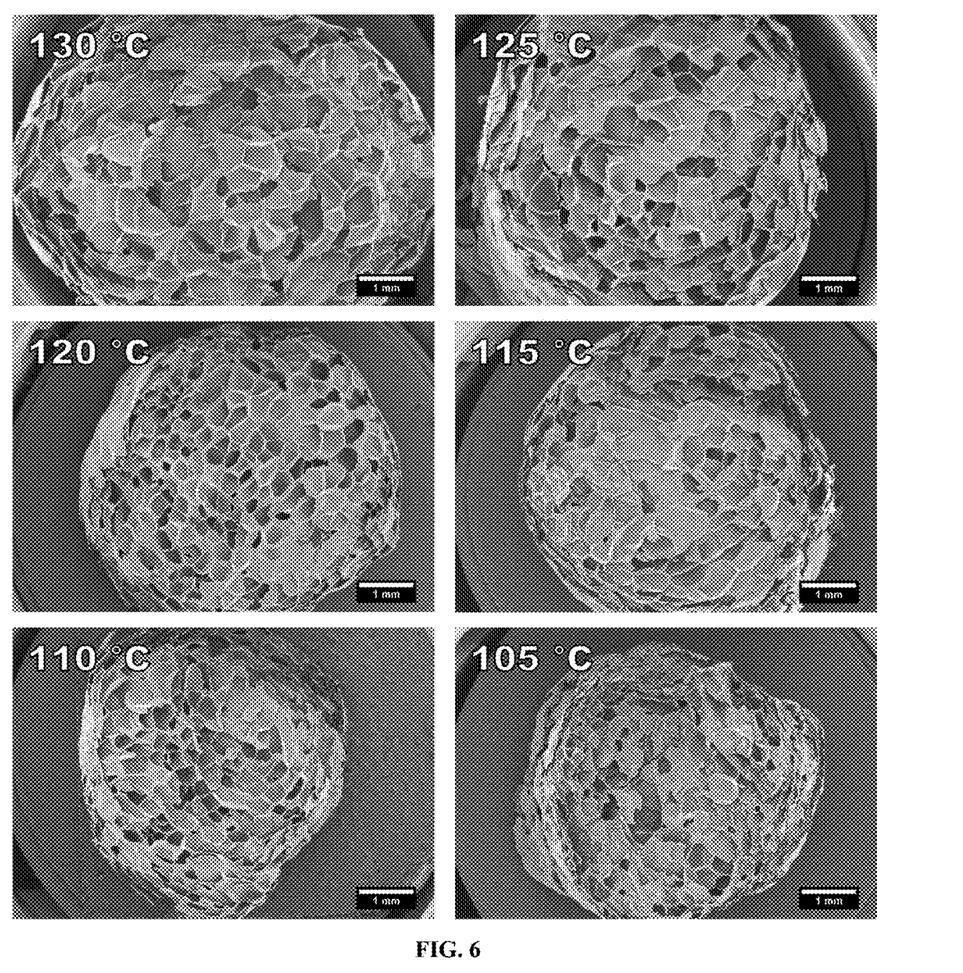
FIG. 6 is a SEM-image showing foams prepared at different temperatures.

The cause of shrunken surface of samples foamed at 130° C. and 125° C. is visible on the SEM images presented in FIG. 6. The cells of these two samples have lost their spherical shape and the cell walls are slightly bent. Under 120° C. the foam morphology starts to get more uniform. Based on the SEM analysis the most uniform cell structure was achieved at 120° C. However, the foams are not very uniform, and the strands have areas of well foamed and poorly foamed material. This non-uniformity in foaming and strand diameter was increased below 120° C. This was also apparent in the SEM analysis, since the poorly foamed areas were more likely to end up in the SEM cross sections.

Figure 7:
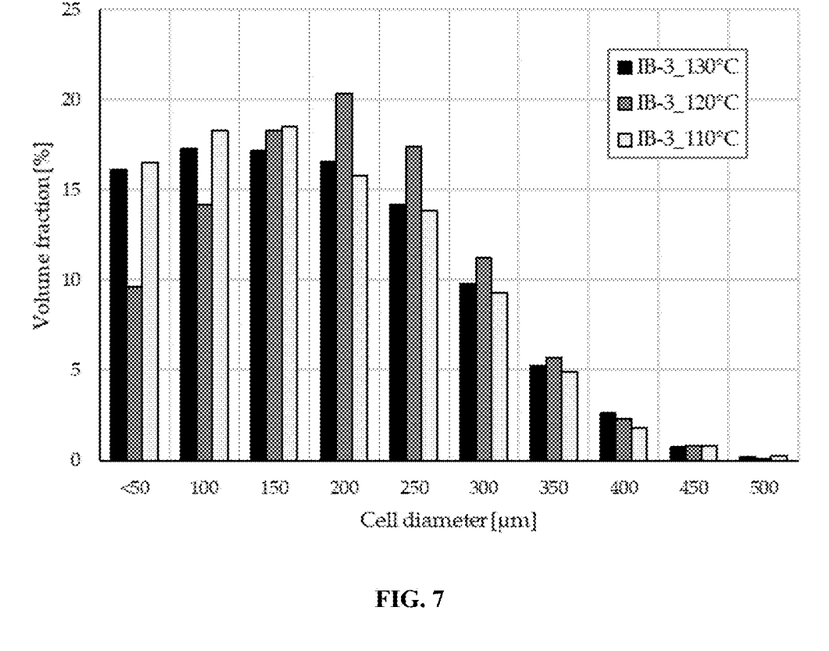
FIG. 7 is a chart describing cell size distribution of selected samples determined with XµCT.

Cell size distribution of samples IB-3_130° C., IB-3_120° C., and IB-3_110° C. were analysed using tomography. Results are presented in FIG. 7. Samples foamed at 130° C. and 110° C. show remarkably similar distribution in cell size despite differences in SEM analysis. Both samples have a strong presence of small cell (<150 μm) but for different reasons. The average cell size is determined by fitting a sphere inside a measured void. Since the foaming temperature has essentially been too high for IB-3_130° C. and the cell have shrunk or collapsed slightly, the average cell size is also reduced. At 110° C., the temperature starts to get too low and the material viscosity high. Therefore, it is harder for the isobutane to form large cell into the material. Additionally, at low temperature the die pressure is increased, which promotes higher cell density and smaller cells. The mean cell size for IB-3_130° C. and IB-3_110° C. is 182 μm and 178 μm respectively with similar distribution. IB-3_130° C. has slightly more cells above 150 μm and especially above 300 μm, which can indicate occurrence of cell coalescence. The well-defined cell structure of Sample IB-3_120° C. is also visible in the tomography data. While the average cell size achieved at 120° C. is slightly higher at 198 µm but the cell size distribution is also the narrowest. At 120° C., the material has a suitable amount stiffness to stabilize the cell structure preventing shrink while having low enough viscosity for achieving maximal cell expansion.

Foam appearance, SEM images and tomography data all show differences between the foaming temperatures. However, densities of the foams are surprisingly similar as can be seen on Table 4. While the differences are small, some conclusions can be made that support previous findings. At low temperature of 105° C., the density starts to increase since the foam expansion is restricted due to material solidification. Nevertheless, at the selected temperature range foaming temperature has little effect on foam density. This is not very common as generally foaming temperature influences density. Additionally, uniform cell structure can be sometimes achieved with the expense of increased foam density. In the case of cellulose palmitate relatively uniform cell structure can be achieved with isobutane without sacrificing density.

TABLE 4

Densities of prepared cellulose palmitate foams using different foaming temperatures and 3% IB as foaming agent.

| Sample ID | Density [g/cm$^3$] |
|---|---|
| IB-3_130° C. | 0.18 ± 0.00 |
| IB-3_125° C. | 0.18 ± 0.01 |
| IB-3_120° C. | 0.19 ± 0.00 |
| IB-3_115° C. | 0.18 ± 0.01 |
| IB-3_110° C. | 0.19 ± 0.01 |
| IB-3_105° C. | 0.21 ± 0.01 |

CONCLUSIONS

Foamability of cellulose palmitate was tested with three physical blowing agents: isobutane, nitrogen, and carbon dioxide. All three blowing agents were able to foam the material successfully and achieve densities below 0.20 g cm$^{-3}$. However, major differences in foam morphology were noticed between the blowing agents. Nitrogen produced foams with the most uniform cell structure and the smallest average cell size without visible shrinking. Nitrogen was also able to foam the material with very low dosage of 0.5 wt %. Isobutane produced foams with the largest average cell size and with visible shrinking. Carbon dioxide produced foam with average cell size between that of nitrogen and isobutane, but also with significant shrinking and poor surface quality. Higher amount of isobutane and carbon dioxide than nitrogen was required to foam the material fully, around 3 wt %.

While the average cell size with isobutane was largest of the three blowing agents, it was still deemed as the most suitable blowing agent to conduct foaming temperature optimization studies. Foaming temperatures in the range of 105-130° C. with 3 wt % isobutane were tested. While higher radial foam expansions were encountered at high temperatures (130° C.) than low temperatures (110-105° C.), foaming temperature had very little effect on foam density. Additionally, cell size distribution developed at high and low temperatures was relatively similar, but for different reasons. At high temperatures, foam shrank due to poor cell wall stiffness and rapid gas loss, resulting in higher number of small cells. At low temperatures, higher number of small cells were developed due to high material viscosity and increased die pressure, which promotes nucleation. Optimal foaming temperature for cellulose palmitate material with 3 wt % isobutane was around 120° C. since at that temperature most uniform cell size distribution with low 0.19 g cm$^{-3}$ density was achieved.

Used cellulose palmitate material was rather non-uniform which had an influence the overall foam quality. The material uniformity has also undoubtedly masked some of the foaming characteristics caused by different blowing agents and foaming temperatures. Nevertheless, clear conclusions were able to be made. Further studies should focus on improving material uniformity for foaming purposes and greater foaming characteristics.

CITATION LIST

Patent Literature

WO 2016/193542 A1

Non-Patent Literature

1. Willberg-Keyriläinen P., Talja R., Asikainen S., Harlin A, Ropponen J., *The effect of cellulose molar mass on the properties of palmitate ester*, Carbohydrate Polymers, Vol. 151, pp 988-995, 2016, doi: 10.1016/j.carbpol.2016.06.048.

The invention claimed is:

1. An extrusion foaming method for producing an extrusion foam from a thermoplastic cellulose-based starting material, wherein the method comprises:
    preparing a thermoplastic molar mass controlled cellulose ester or ether having chain length between C6 and C18,
    injecting the thermoplastic molar mass controlled cellulose ester or ether and a nucleating agent into an extruder,
    injecting a foaming agent into the extruder,
    applying a temperature of 80 to 150° C. to the extruder during foam processing, and
    collecting the produced extrusion foam.

2. The method according to claim 1, wherein the thermoplastic cellulose-based starting material is a softwood dissolving grade pulp.

3. The method according to claim 1, wherein the foaming agent is selected from the group consisting of isobutane, carbon dioxide, nitrogen and pentane.

4. The method according to claim 1, wherein the temperature is kept constant during the foam processing.

5. The method according to claim 1, wherein a constant temperature of 105 to 140° C. is applied to the extruder during the foam processing.

6. The method according to claim 1, wherein the nucleating agent is selected from the group consisting of talc, calcium carbonate, calcium hydroxide, calcium stearate, zinc stearate, aluminium stearate, azodicarboamide, sodium bicarbonate, a mixture of citric acid and sodium bicarbonate, sodium and potassium benzoates, and dibenzylidene sorbitol (DBS).

7. The method according to claim 1, wherein the foaming agent is provided at a concentration of 0.2 to 10 wt-%.

8. The method according to claim 1, wherein the extruder comprises a screw geometry suitable for material melting and foaming agent homogenization, a foaming agent injection device, or a static mixer or tandem extruder and a die to produce the extrusion foam in a desired foam shape, and optionally a melt pump.

9. The method according to claim 1, wherein the molar mass controlled cellulose ester or ether is cellulose palmitate having a chain length of C16 and a total degree of substitution from 0.7 to 3.

10. The method according to claim 1, comprising using a die pressure of 50 to 300 bars.

11. A thermoplastic cellulose-based extrusion foam produced by the process according to claim 1.

12. The thermoplastic cellulose-based extrusion foam according to claim 11, wherein the extrusion foam comprises a density of 0.1 to 0.5 g/cm$^3$.

13. The method according to claim 1, wherein the foaming agent comprises isobutane.

14. The method according to claim 1, wherein the nucleating agent comprises talc.

15. The method according to claim 1, wherein the foaming agent comprises nitrogen provided at a concentration of 1% or less.

16. The method according to claim 1, wherein the temperature is 120 to 130° C.

17. The method according to claim 1, wherein the foaming agent is provided at a concentration of 0.2 to 2.5 wt-%.

* * * * *